United States Patent [19]
Stephens et al.

[11] 3,874,597
[45] Apr. 1, 1975

[54] FLUID DISTRIBUTION STRUCTURES

[75] Inventors: James B. Stephens, La Crescenta; William A. Owen; Charles G. Miller, both of Pasedena, all of Calif.

[73] Assignee: Westates Space-Era Products, Inc., South El Monte, Calif.

[22] Filed: June 20, 1974

[21] Appl. No.: 481,050

[52] U.S. Cl.................. 239/542, 239/547, 239/563
[51] Int. Cl............................................ B05b 15/00
[58] Field of Search .......... 239/563, 547, 542, 269; 138/39–46, 118, DIG. 8, DIG. 11; 137/517; 251/145

[56] References Cited
UNITED STATES PATENTS

| 3,361,363 | 1/1968 | Babington | 239/547 X |
| 3,456,683 | 7/1969 | Roulet et al. | 137/517 |
| 3,774,850 | 11/1973 | Zeman | 239/547 X |
| 3,782,635 | 1/1974 | Krawczyk | 239/450 X |

Primary Examiner—Stanley H. Tollberg
Assistant Examiner—John P. Shannon
Attorney, Agent, or Firm—Edward D. O'Brien

[57] ABSTRACT

A fluid distribution structure which is primarily useful in dispensing relatively measured quantities of water at various points along the length of the structure can be constructed utilizing an elongated, flexible conduit which will normally be collapsed so as to have sides relatively close to one another when no fluid under pressure is present within the interior of the conduit. A plurality of pressure responsive closures are located along the length of the conduit so as to divide the interior of the conduit into a plurality of sections. At least one hole leads from the interior of the conduit in each of these sections and a flow control member is associated with each of the holes. When fluid under pressure is applied to one end of the conduit the closures will gradually permit the entire length of the conduit to fill with fluid and become expanded. As the conduit is so expanded the flow control members will severely restrict flow through the holes. When the pressure of the applied fluid is stopped the closure means will close off the sections from one another and the fluid within the sections will escape through the holes past the flow control members as the conduit gradually flattens out and/or collapses.

8 Claims, 3 Drawing Figures

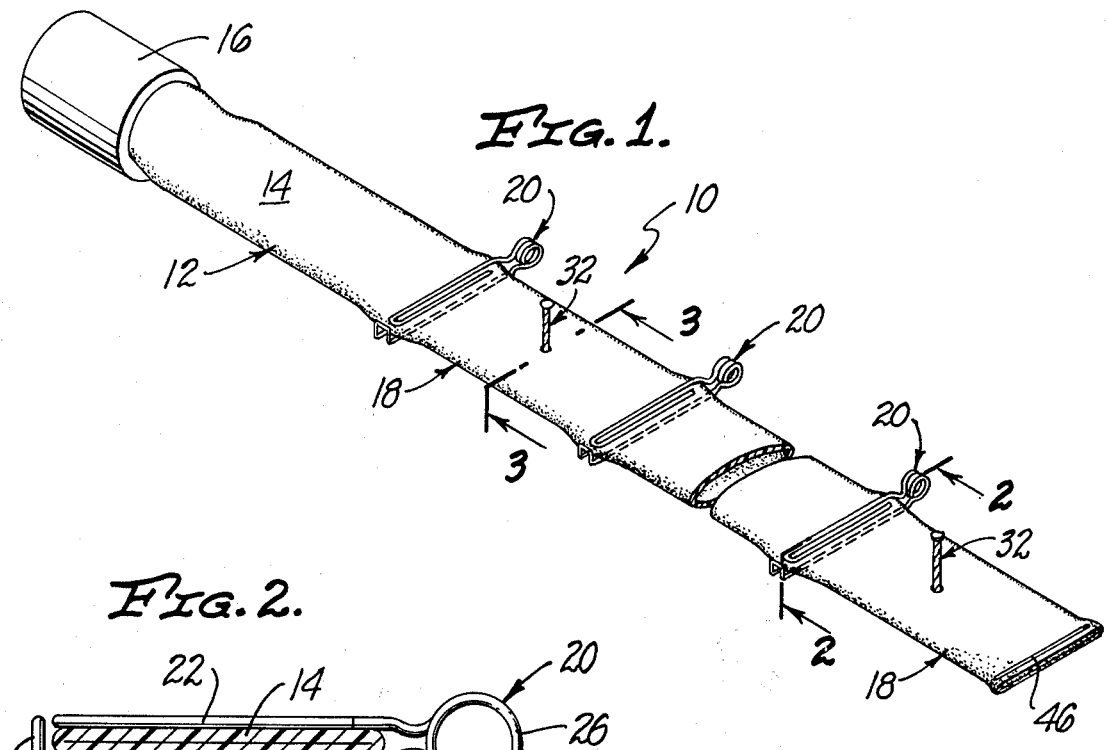
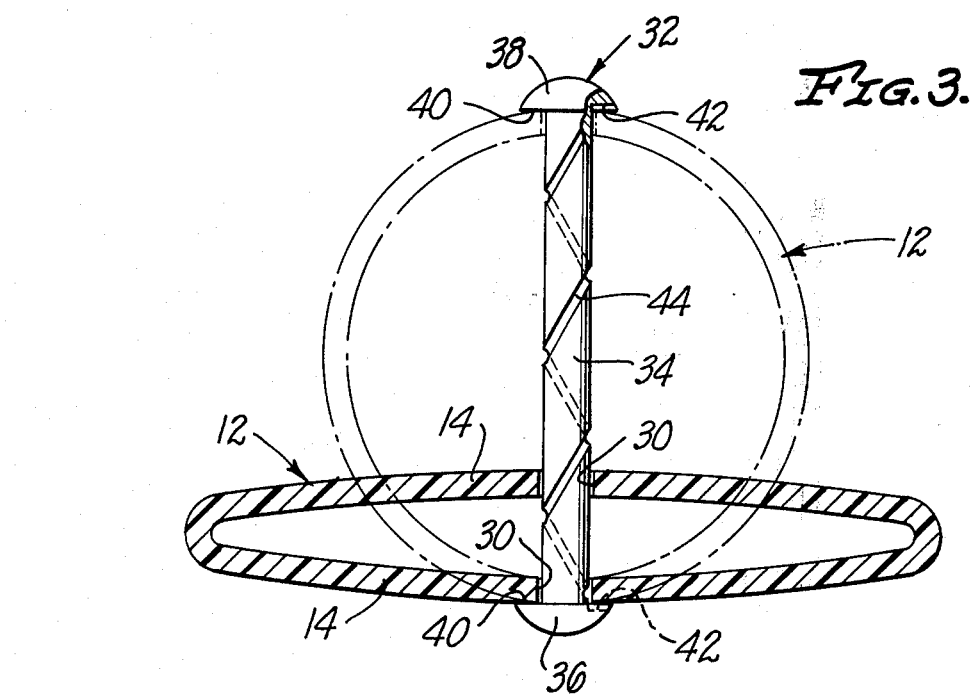

FLUID DISTRIBUTION STRUCTURES

CROSS-REFERENCE TO RELATED APPLICATIONS

This application relates to subject matter which is disclosed and claimed in the copending, commonly owned U.S. Pat. application Ser. No. 482,372, filed June 24, 1974, entitled "Liquid Distribution Systems" and subject matter which is disclosed and claimed in the copending, commonly owned, U.S. Pat. application Ser. No. 492,488 filed July 29, 1974, entitled "Fluid Dispensing Structures". The entire disclosures of both of these copending applications are incorporated herein by reference.

BACKGROUND OF THE INVENTION

The invention set forth in this specification pertains to new and improved fluid distribution structures. More specifically, it pertains to structures of this type which are primarily intended to be utilized in watering plants in various types of agricultural applications.

It is to be understood, however, that fluid distribution structures falling within the broad scope of the invention can be utilized for a wide variety of different purposes outside of the agricultural field. Because the presently intended utilization of the invention is in the agricultural field and because the invention was developed in order to fulfill a certain type of need in this field, it is not considered necessary to discuss all conceivable applications of the invention set forth in this specification. Such applications can be in a large number of different fields.

The need for the invention referred to in the preceding is related to the problem of dispensing or distributing water on hillsides, in valleys, and the like, at various different elevations or altitudes. Because of various fluid flow considerations there has been a problem in the past of distributing water in uniform quantities at various locations along the length of an elongated distribution conduit and especially along the length of such a conduit, parts at which lie at different elevations. This problem is acute where there are periodic variations in the pressure of the water supply. A wide variety of expedients have been proposed in order to make it possible to dispense uniform quantities of water at various points along the length of such a conduit.

Although it would be possible to encumber this specification with an extremely voluminous discussion of known expedients for this purpose, it is not considered that such a discussion would significantly promote an understanding of the present invention. Prior manners of distributing water at various points along the length of a conduit in an effort to obtain substantially uniform distribution of water at each of such points are not considered to have resulted in a desirable, effective and/or acceptable system for any one of a variety of utilitarian or economic reasons. Hence, there is a continuing present need for new and improved fluid distribution structures.

SUMMARY OF THE INVENTION

A broad objective of the present invention is to fulfill this need. More specifically, the invention is primarily intended to provide new and improved fluid distribution structures which can be utilized to dispense substantially equal quantities of a fluid such as water at various points along the length of such a structure, even when such a structure is used so as to extend in other than a horizontal manner or even when the pressure of the water supplied to such a structure varies. Other objectives of the invention are to provide fluid distribution structures as described which may be easily and conveniently constructed at a comparatively nominal cost, which may easily be used for their intended purpose, and which are capable of giving relatively prolonged, reliable performance with a minimum of maintenance.

In accordance with this invention these objectives are achieved by providing a fluid distribution structure which comprises: an elongated, flexible conduit having ends, one of which is adapted to be connected to a source of fluid under pressure, a plurality of pressure responsive closure means located along the length of the conduit, each of the closure means being capable of closing off the interior of the conduit so as to divide the conduit into a plurality of isolated sections, at least one hole leading through the conduit from the interior of each of these sections, a flow control member associated with each of the holes, each of the flow control members permitting flow through its associated hole at one rate when the conduit is expanded as a result of the sections containing a fluid under pressure and being capable of permitting flow to the associated hole at a greater rate when the conduit is not so expanded.

BRIEF DESCRIPTION OF THE DRAWING

The invention has a number of features and aspects which inherently cannot be indicated in a relatively brief summary such as the preceding. Further details of the invention as well as many features and advantages of it will be apparent from a detailed consideration of the remainder of the specification, the appended claims, and the accompanying drawing in which:

FIG. 1 is a partial isometric view of a presently preferred embodiment or form of a fluid distribution structure in accordance with this invention;

FIG. 2 is a cross-sectional view taken at line 2—2 of FIG. 1;

FIG. 3 is an isometric view of a pressure responsive closure as is used with the complete structure illustrated in FIG. 1.

This illustrated structure is constructed so as to utilize certain essentially intangible concepts or principles as are set forth or defined in the appended claims forming a part of this disclosure. It will be apparent that these concepts and principles can be employed in somewhat different manners in various different structures through the use or exercise of routine engineering skill or ability.

DETAILED DESCRIPTION

In the drawing there is shown a fluid distribution structure 10 in accordance with this invention which utilizes an elongated, flexible conduit 12 which, when it does not contain internal fluid under pressure is adapted to be collapsed substantially as shown so as to have sides 14 located adjacent to one another. Such a conduit 12 may be easily manufactured by conventional extrusion techniques out of known polymer materials such as various plasticized vinyl compositions, polyolefins, or the like.

Preferably the wall thickness in the conduit 12 should be as thin as reasonably possible so that the entire structure 10 will be comparatively inexpensive and so that the conduit 12 will be sufficiently flexible so that it will collapse as a result of its own weight to a comparatively flat structure when it does not contain fluid under pressure. Various specialized cross-sectional configurations may be utilized in forming the conduit 12 so as to facilitate this conduit 12 being capable of collapsing so as to have sides 14 located adjacent to one another. It is presently preferred that the conduit 12 be of a circular configuration when expanded. Conduits of this shape are comparatively inexpensive, easily obtainable, and effective for use in accordance with the invention.

The particular conduit 12 shown is adapted to be expanded to such a configuration or nearly to such a configuration by connecting one of its ends to a source of fluid under pressure (not shown) such as, for example, a valve connected to a water line or the like (not shown). Although such a connection may be accomplished by merely slipping the conduit 12 over a conventional male tubing fitting it is considered preferable to utilize a conventional coupling 16 to secure the conduit 12 as indicated.

When the conduit 12 is so secured prior to its being used it will lie in a generally flat, collapsed condition with the sides 14 located adjacent or substantially adjacent to one another. In this configuration the conduit 12 is divided up along its length into a series of sections 18. Any number of sections 18 desired may be used; preferably they are all identically formed. Such division of the conduit 12 is accomplished through the use of pressure responsive closure clips 20. Each of such clips includes two arms 22 and 24 connected together by a curved spring section 26.

These arms 22 and 24 are held by the spring section 26 so that they normally force the sides 14 together and are biased against these sides 14 by the spring section 26. If desired, flange-like retainers 28 may be utilized in the arms 22 and 24 to prevent the conduit 12 from slipping out from between these arms 22 and 24 as the structure 10 is used. It will be recognized that the clips 20 illustrated are in some respects analagous to a conventional clothespin. A wide variety of differently constructed closures corresponding to the clips 20 can be used.

The conduit 20 also includes at least one hole 30 located in the sides 14 in each of the sections 18. Preferably, each of these sections 18 includes aligned holes 30. The aligned holes 30 in each section 18 are adapted to contain what may be referred to as a flow control member 32. These members 32 may be constructed in a wide variety of different ways out of different materials as are indicated in the co-pending application entitled "Fluid Dispensing Structures" identified in the preceding. They also may be referred to by different names.

The particular flow control members 32 shown in the drawing take the form of hollow rivets each of which has a shank 34 traversing two aligned holes 30 and each of which has a head 36 and a normal flanged head or end 38. The head 36 and the end 38 are provided with flat or nearly flat under surfaces 40 which are adapted to fit against the sides 14 when the conduit 12 is expanded so that only limited quantities of a fluid can escape from within the interior of the conduit 12.

The invention, however, requires that a restricted or limited amount of fluid be capable of escaping between at least one of the surfaces 40 on each of the flow control members 32. Because of the deformable character of the material used in the conduit 12 it is normally necessary to provide a groove 42 in at least one and preferably both of the surfaces 40 on a flow control member 32 in order to permit such limited escape of fluid. It is considered that it should be possible to obtain the same results by knurling or otherwise roughening a surface 40.

The shanks 34 in the flow control members 32 are preferably dimensioned so as to fit somewhat freely within the holes 30 in such a manner that the sides 14 may ride up and down on these shanks 34 as the internal pressure within a section 18 changes. A structure 10 is so constructed to provide a greater amount of flow from within the interior of the section 18 when at least one of the sides 14 is spaced away from at least one of the surfaces 40 than is permitted when the sides 14 are brought against the surfaces 40. Such an increased amount of flow can be achieved by either regulating the diameter of the hole and/or by locating a groove 44 along the length of each shank 34. The grooves 44 are preferably spiraled around the shanks 34 so as to achieve a self-cleaning type of action as indicated in the noted co-pending application entitled "Fluid Dispensing Structure".

When the structure 10 is to be utilized a fluid such as water is admitted to the conduit 12 under pressure. This will inflate the conduit 12. As the pressure reaches successive of the clips 20 these clips 20 will be forced by the pressure to open up to a sufficient extent so that in time the entire conduit 12 will be inflated and so that the sides 14 of the conduit within the individual sections 18 will be expanded against the surfaces 40. This is indicated by the tube 12 shown in phantom lines in FIG. 3. When this condition is reached, flow from the end of the conduit 12 remote from the coupling 16 will normally be prevented by a conventional closure 46 such as a sealed joint.

When the entire conduit 12 is so inflated no further fluid under pressure can flow into it except to replace limited quantities of fluid which will seep out from under the surfaces 40 on the flow control members 32. At this point the supply fluid is shut off. As internal pressure is gradually relieved by this seepage, the clips 20 will close so as to segregate the sections 18 with substantially uniform measured amounts of water in each. At this point there will be further flow from around each of the flow control members 32 and the rate of such flow will increase as the sides 14 settle to a collapsed configuration and move away from the surfaces 40. In due course these sections 18 will be substantially emptied of water (or other fluid) in this manner.

It will be realized that the noted operation of the structure 10 may be repeated at successive time intervals. This may be accomplished automatically through the use of a time clock or similar mechanism (not shown) controlling the operation of a conventional valve or the like (not shown) employed to control a fluid being supplied to the conduit 12. Preferably the entire structure 10 is utilized as set forth in the aforenoted patent application entitled "Liquid Distribution System" so as to prevent the conduit 12 from being held under pressure for a prolonged period and so as to control the use of the structure 10 in accordance with an independent variable such as ambient moisture level.

The structure 10 is considered to be primarily desirable in use in distributing substantially measured or uniform quantities of water in various locations which differ from one another in altitude or elevation or from a fluid supply source which delivers fluid at varying pressures. This is because the quantity of water dispensed from each of the sections 18 is substantially independent of fluid pressure applied to the conduit 12 and manifested at any point along the length of this conduit 12. If it is desired to dispense unequal quantities of fluid from various sections 18 this may be accomplished by varying the spacing between the clips 20. Also such variation may be achieved by using differently sized flow control members 32 with different sections 18 and/or using more of such members 32 with certain sections than with others or by varying the dimensions of the sections 18.

We claim:

1. A fluid distribution structure which comprises:
   an elongated, flexible conduit having ends, one of said ends being adapted to be connected to a source of fluid under pressure and having sides which collapse towards one another when there is no pressure within said conduit.
   a plurality of pressure responsive closure means located along the length of said conduit, each of said closure means being capable of closing off the interior of said conduit so as to divide the interior of said conduit into a plurality of isolated sections.
   at least one hole leading through said conduit from the interior of each of said sections,
   a flow control member associated with each of said holes, each of said flow control members including shank extending through the hole associated with it and a head capable of fitting against the exterior of said conduit when said conduit is expanded as a result of fluid under pressure being located within the interior of said conduit,
   said holes being dimensioned relative to said shanks so that fluid can escape from the interior of said conduit through said hole when such fluid is present within said conduit under pressure.

2. A fluid distribution structure as claimed in claim 1 wherein: each of said closure means comprises a clip means including two arms connected by a spring section, said arms fitting against said sides and being capable of moving apart in response to internal pressure within said conduit.

3. A fluid distribution structure as claimed in claim 1 wherein:
   each of said flow control members is an elongated member having a shank with a head located at each end thereof each of said shanks fitting within two aligned holes in said conduit, said sides of said conduit being capable of moving along the lengths of said shanks, said heads serving to retain said flow control members on said conduit.

4. A fluid distribution structure as claimed in claim 3 wherein:
   said sides are capable of fitting against said head when said conduit is expanded in response to internal fluid under pressure so that less fluid will flow from the interior of said conduit than will flow when said sides are not held against said heads by fluid under pressure.

5. A fluid distribution structure as claimed in claim 3 wherein:
   said heads are provided with under-surfaces which permit limited flow from within the interior of said conduit when said sides are located against said heads and wherein said shanks are dimensioned relative to said holes so as to permit a greater amount of flow when said sides are not held against said heads.

6. A fluid distribution structure as claimed in claim 1 wherein:
   each of said closure means includes two arms connected by a spring section, said arms fitting against said sides and being capable of moving apart in response to internal pressure within said conduit,
   each of said flow control members is an elongated member having a shank with a head located at each end thereof each of said shanks fitting within two aligned holes in said conduit, said sides of said conduit being capable of moving along the lengths of said shanks, said heads serving to retain said flow control members on said conduit,
   said heads are provided with under-surfaces which permit limited flow from within the interior of said conduit when said sides are located against said heads and wherein said shanks are dimensioned relative to said holes so as to permit a greater amount of flow when said sides are not held against said heads.

7. A fluid distribution structure which comprises:
   an elongated conduit having ends, one of said ends being adapted to being connected to a source of fluid under pressure, said conduit including a plurality of sections having a normally collapsed configuration, said sections being capable of being inflated in response to fluid pressure within said conduit,
   a plurality of pressure responsive closure means isolating successive of said sections along the length of said conduit, said closure means being capable of being opened in response to the presence of fluid under pressure within the interior of said conduit,
   flow control means associated with each of said sections along the length of said conduit, said flow control means permitting limited flow from the interiors of said sections to the exteriors thereof as fluid under pressure is supplied to the interiors of said sections, said flow means also permitting limited flow from the interiors of said sections when fluid under pressure is no longer supplied to said one of said ends, the escape of fluid from within the interiors of said sections when fluid is no longer supplied under pressure to said one of said ends permitting all of said pressure responsive closure means to close in response to drops in internal pressure within said sections, said flow control means permitting said sections to collapse as a result of the escape of fluid within them as they are isolated from one another by said pressure responsive closing means 8. A fluid distribution structure as claimed in claim 7 wherein:
   said flow control means permit a greater amount of flow from the interiors of said sections to the exteriors thereof when said sections are not inflated to their fullest extent than when said sections are inflated to their fullest extent.

* * * * *